D. H. BUCKLEY.
STEERING GEAR CONNECTION.
APPLICATION FILED OCT. 13, 1910.
1,000,893.
Patented Aug. 15, 1911.
Fig. 1.
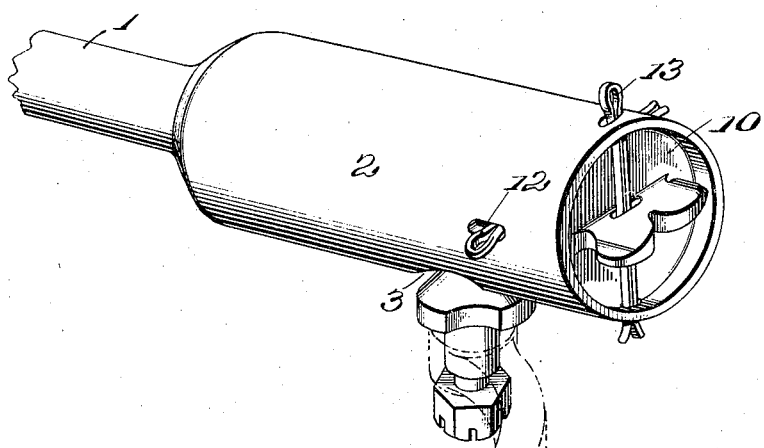
Fig. 2.
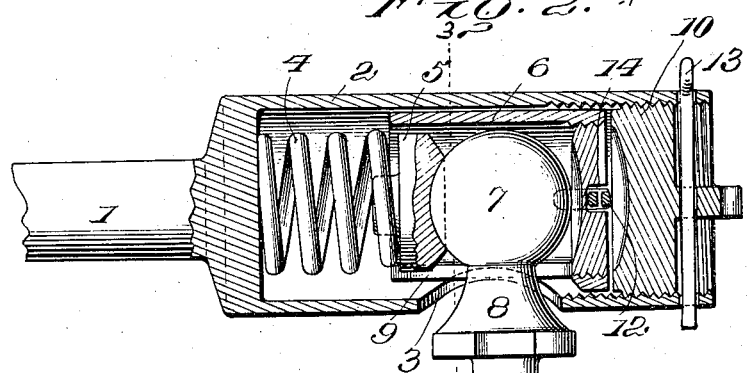
Fig. 3.
Witnesses
W. A. Williams
Francis S. Magnus
Inventor
Dan H. Buckley
By George W. Upston
Attorney

UNITED STATES PATENT OFFICE.

DUER H. BUCKLEY, OF VIENNA, OHIO, ASSIGNOR OF ONE-HALF TO CHARLES C. WILLIAMS, OF WARREN, OHIO.

STEERING-GEAR CONNECTION.

1,000,893.  Specification of Letters Patent.  Patented Aug. 15, 1911.

Application filed October 13, 1910. Serial No. 586,902.

*To all whom it may concern:*

Be it known that I, DUER H. BUCKLEY, a citizen of the United States, residing at Vienna, in the county of Trumbull and State of Ohio, have invented certain new and useful Improvements in Steering-Gear Connections, of which the following is a specification.

The object of this invention is to provide an improved steering gear connection of the ball and socket type primarily adapted for motor vehicles.

The invention will be hereinafter fully set forth and particularly pointed out in the claims.

In the accompanying drawings, Figure 1 is a view in perspective of my steering rod connection. Fig. 2 is a side elevation thereof, with parts in section. Fig. 3 is a sectional view on line 3—3, Fig. 2.

Referring to the drawings, 1 designates a portion of a steering rod shown equipped with a tubular housing 2 having an opening 3 in one side through which is passed the ball member of a ball and socket connection by which one end of the steering rod is connected with the steering wheel knuckle. A similar coupling may connect the other end of the rod 1 with the steering post. A detail description of one coupling will suffice.

Within the housing 2, at its closed end, is a coiled spring 4 which forms a buffer against which fits a cupped or concaved block 5 forming one of the socket members of the connection. The other socket member is in the form of a sleeve 6 closed at one end, such end being cupped to conform to ball member 7 of the connection, a spindle 8 of such ball member passing through a slot 9 in the sleeve. This slot is of less width than the diameter of the ball 7, so that when the parts are assembled the ball 7 cannot be pulled out from its socket. The block 5 is designed to fit within the walls of the sleeve 6, being held therein and in engagement with the ball by the spring 4.

The open end of the housing 2 is interiorly threaded to accommodate a screw plug 10 by which the parts are held in place. Additional securing means are shown in the form of two cotter pins 12 and 13, the pin 12 being inserted through the housing 2 between the plug 10 and the sleeve 6, and pin 13 outside of the plug. By engagement with a groove 14 in the sleeve the pin 12 serves to prevent rotary movement of the sleeve within the housing.

The parts are assembled by first inserting the spring 4 in the housing 2, then placing the block 5 in contact with the spring. The ball member 7 is then passed through the opening 3 in the housing and sleeve 6 is inserted through the open end of the housing, the slot 9 of the sleeve permitting passage thereof over the ball. The sleeve is forced in until its wall encircles the block 5, which is held against the ball by spring 4. The cotter pin 12 is then fixed in position, the plug 10 screwed home, and the pin 13 passed through the housing.

The advantages of my invention will be apparent. It will be observed that by the use of the sleeve with its slotted opening of less width than the diameter of the ball member 7 there is no danger of the parts being disconnected in the event of accident. It is not possible to separate the ball joint from its socket members other than by removing the cotter pins and screw plug. The necessary resiliency of the connection is provided by the spring set well within the housing, this spring acting as a buffer when the machine is being jolted.

I claim as my invention:—

1. A ball and socket connection comprising a housing open at one end and having an opening in one side, a sleeve within said housing having a slot adapted to aline with said opening, said slot being of less width than said opening, a ball within said sleeve having its shank extending through said slot and said opening, and a plug for closing the open end of said housing.

2. A ball and socket connection comprising a housing having an opening in one side, a slotted sleeve within said housing, a block in said sleeve, said sleeve and block forming a socket, and a ball joint in said socket having a shank extending through the slot in said sleeve and the opening in said housing.

3. A ball and socket connection comprising a housing open at one end and having an opening in one side, a sleeve within said housing having a slot of less width than the opening in said housing, a block fitting within said sleeve, said sleeve and block having concaved opposing surfaces forming a socket, a ball joint in said socket having its shank extending through the slot in said sleeve and the opening in the side of said housing, and a spring tending to force said block against said ball.

4. A steering rod connection comprising a housing open at one end and having an opening in one side, a slotted sleeve in said housing having one end closed and provided with a transverse groove, a pin passed through the housing and groove to prevent rotary movement of the sleeve, a block in said sleeve, a spring bearing on said block, said sleeve and block forming a socket, a ball joint in said socket having a shank extending through the slot of said sleeve and the opening in said housing, and a plug for closing the open end of said housing.

In testimony whereof I affix my signature in presence of two witnesses.

DUER H. BUCKLEY.

Witnesses:
CHARLES C. WILLIAMS,
HOMER E. STEWART.